United States Patent

Hobson, Jr.

[11] 3,922,654
[45] Nov. 25, 1975

[54] MOTION TRANSDUCER AND INDICATOR
[75] Inventor: Howard C. Hobson, Jr., San Francisco, Calif.
[73] Assignee: Rucker Control Systems, Oakland, Calif.
[22] Filed: Mar. 1, 1974
[21] Appl. No.: 447,081

[52] U.S. Cl...... 340/201 P; 250/237 R; 340/18 DC; 340/205
[51] Int. Cl.² ......................................... G08C 19/16
[58] Field of Search ......... 340/18 DC, 18 LD, 18 P, 340/188 R, 190, 201 P, 204, 366 E, 365 P, 260; 116/124 A; 250/570, 237 G; 235/61.11 E

[56] References Cited
UNITED STATES PATENTS

| | | | |
|---|---|---|---|
| 3,333,257 | 7/1967 | Shepherd et al. | 340/203 |
| 3,357,011 | 12/1967 | Diaz | 340/347 |
| 3,392,378 | 7/1968 | Perry | 340/204 |
| 3,511,410 | 5/1970 | Leining | 222/45 |
| 3,603,968 | 9/1971 | Johnson | 340/336 |
| 3,820,096 | 6/1974 | Himmelsbach et al. | 340/204 |

Primary Examiner—Thomas B. Habecker
Assistant Examiner—James J. Groody
Attorney, Agent, or Firm—Lothrop & West

[57] ABSTRACT

A motion transducer includes a series of lights in a register, the individual lights being energized by timed electronic circuits controlled by the sequential change in energization of three spaced light receivers in line to receive light beams from three similarly spaced light sources and all stationary with respect to one of two relatively movable members, the outer relatively movable member being in part opaque and in part transparent according to a code to pass but one light beam at a time according to the relative position of said members, except at one end position wherein two light beams are simultaneously passed to reset the register.

9 Claims, 3 Drawing Figures

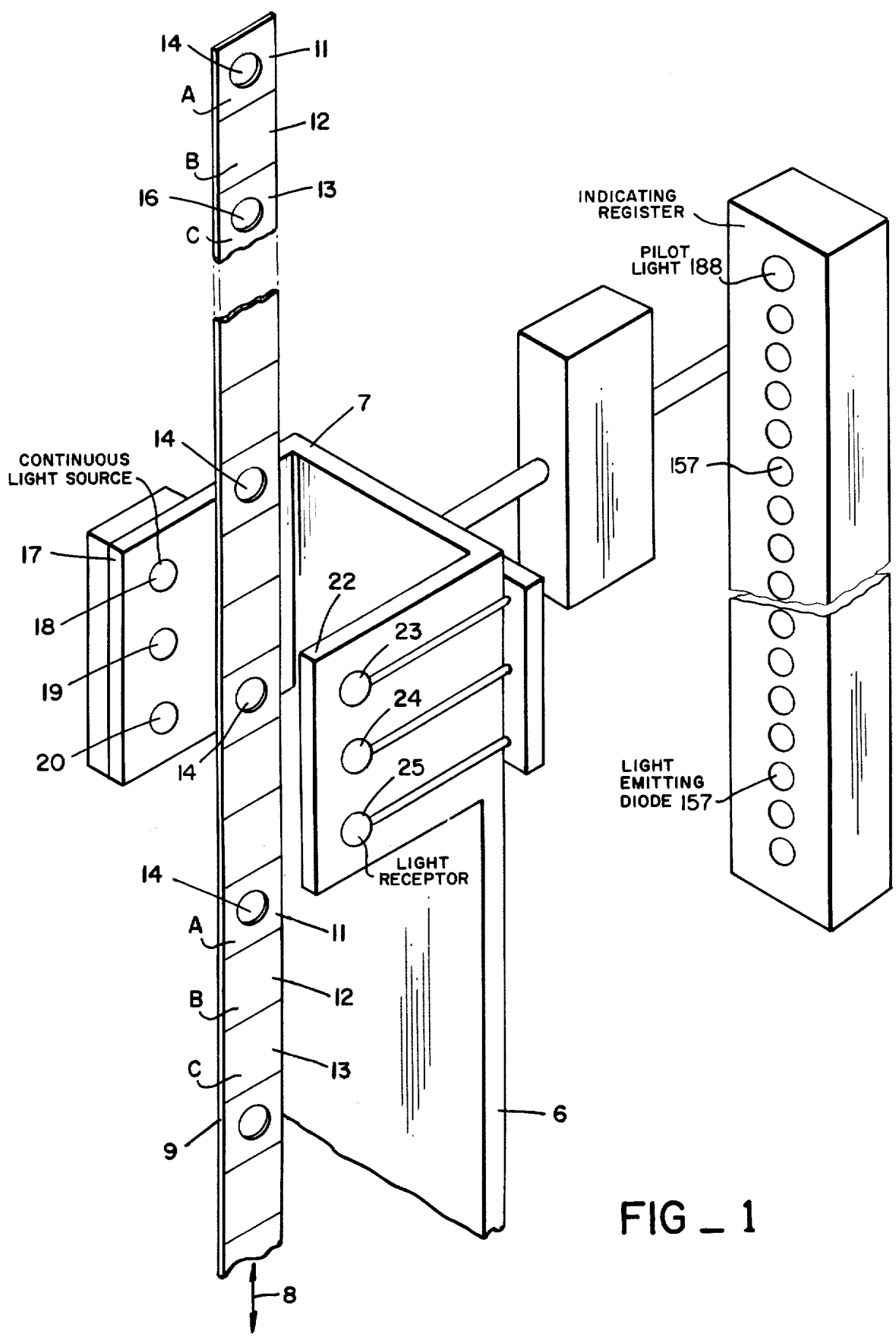
FIG_1

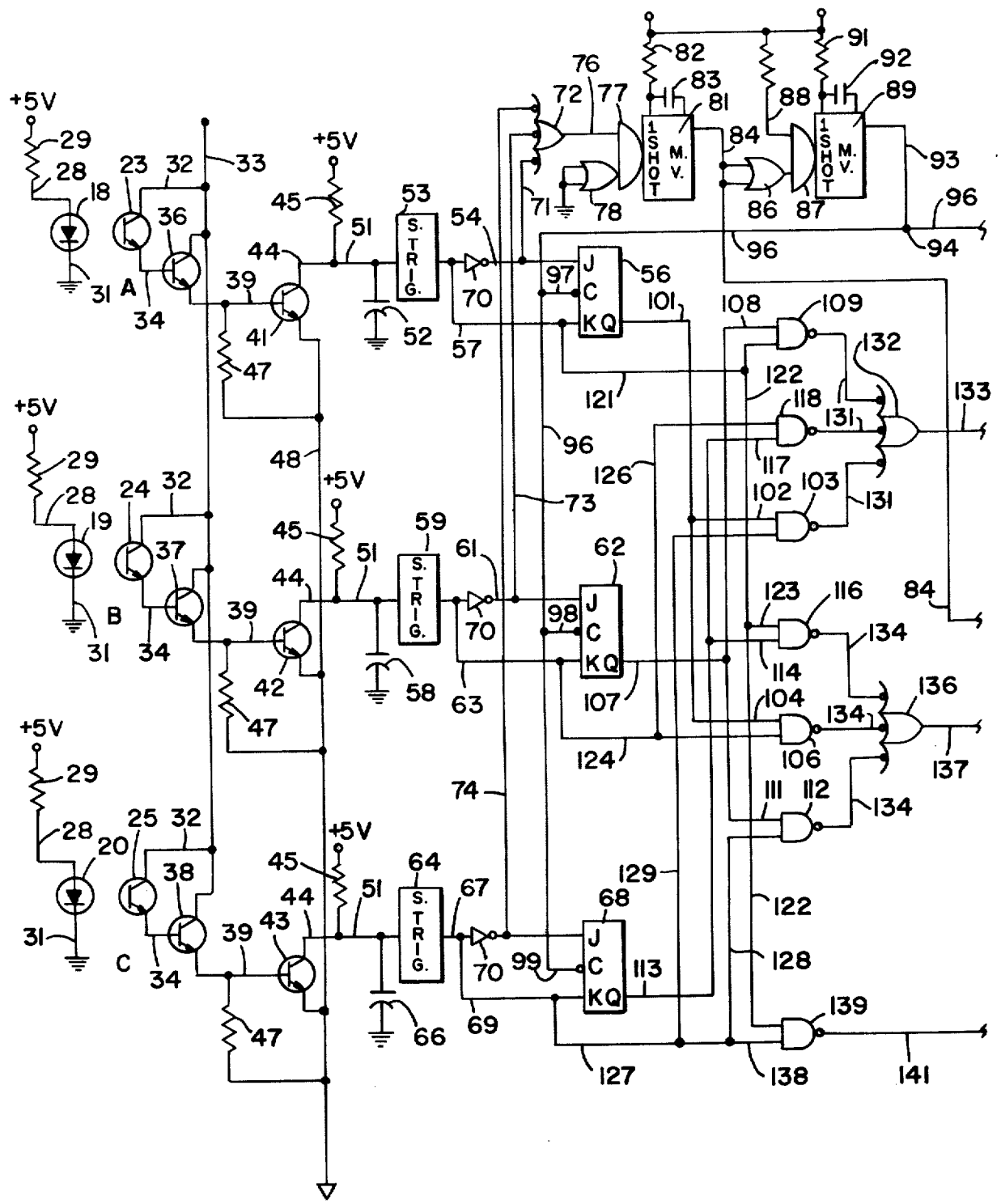
FIG_2

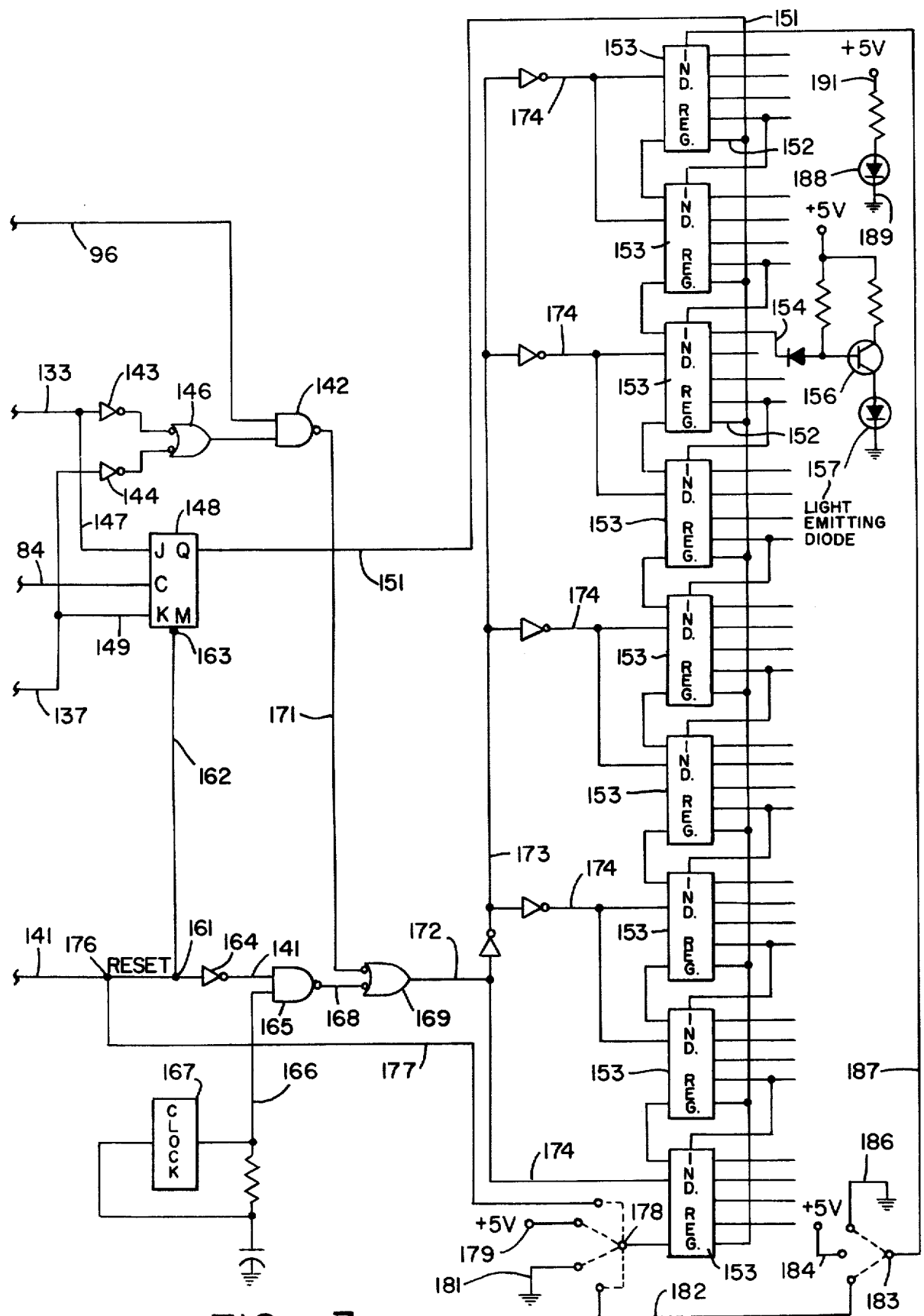
FIG_3

MOTION TRANSDUCER AND INDICATOR

There are many instances in industry in which an indication of the position of a movable member at a remote point is of interest. There are various ways of providing such a remote showing but it is an object of the present invention to provide such a remote indication in a simple, inexpensive and accurate manner.

Another object of the invention is to provide a remote indicator of motion or position by utilizing electronic means.

Another object of the invention is to afford an indicator that can easily be applied to existing or new devices undergoing relative motion in order to supply a clear and accurate remote indication thereof.

A further object of the invention is in general to provide an improved, generally simple, inexpensive, trouble free motion transducer and indicator.

Other objects of the invention are attained in the embodiment of the invention described in the accompanying description and illustrated in the accompanying drawings, in which:

FIG. 1 is a diagram partly in isometric projection, showing the main components of a motion transducer indicator according to the invention;

FIG. 2 is the left half of a block diagram showing circuitry useful in connection with the indicator; and FIG. 3 is the right half of a block diagram showing circuitry useful with the indicator, FIG. 3 when placed on the right side of FIG. 2 affording a complete diagrammatic layout of the circuitry.

While the motion transducer indicator of the invention can be embodied in a large number of different forms, it has with considerable success been commercially embodied as shown herein and as applied in connection with a drilling rig. In that environment it is desired to observe and note the position of a movable component, such as a block, with respect to the platform or deck of the drilling rig. Pursuant to the invention, there is provided on the base platform of the drilling rig a frame 6 secured in position and relatively stationary. The frame 6 incorporates at one end a yoke 7 of generally U-shape. Designed to operate in the yoke in a generally vertical direction, indicated by the double headed arrow 8, is a band or strap 9 at one end secured to a movable element of the drilling rig such as the traveling block. As the traveling block rises and falls with respect to the base or platform or with respect to the stationary upright 6, the strap 9 moves accordingly. The strap 9 is especially provided with a predetermined code or indicator series for indicating position.

In the present instance it can be assumed that the strap 9 is uniformly divided into a number of equal segments or areas such as 11, 12 and 13 in series or in blocks of three and that in each block one of the areas, such as 11, is distinguished from the other two solid areas 12 and 13 by a hole 14, for example. Since the series is in groups of three, a predetermined portion of the length of the strap is periodically pierced by the holes 14. The areas or squares 11, 12 and 13 for convenience are sometimes given alphabetic designations. For example, the area 11 with the opening or hole 14 is designated A, the area 12 by the designation B, and the area 13 by the letter C. It is not necessary that the strap area be actually physically divided or provided with indicia to segregate or denote the individual areas, but it is of interest that the areas 11 with the holes 14 appear at regular intervals and that they have a predetermined distance relationship with the other areas such as 12 and 13.

At one end, such as the upper end of the strap 9, there is provided a special area series. There are still the areas 11, 12 and 13 (or A, B and C) in the same order as before, but also there is a special arrangement in that while the area A has the customary perforation 14, the area 13 or C in this instance and uniquely has an additional perforation 16. This will be referred to later.

Particularly pursuant to the invention, the yoke 7 on one of its arms 17 is provided with sources of light 18, 19 and 20 in vertical alignment and spaced apart with the same vertical spacing as the areas 11, 12 and 13 and arranged generally to align transversely with the opening 14 in its different positions.

On the opposite arm 22 of the yoke 7 and in similar spacing and alignment there are provided receptors 23, 24 and 25 of illumination. As the strap 9 rises and falls with respect to the yoke, there is from time to time transmission of light from the source 18 to the receptor 23 of from the source 19 to the receptor 24 or from the source 20 to the receptor 25, but at any one time but a single source is effective upon a single receptor as at that time, the other sources are blocked from effect upon the other receptors. This is because of the opaque nature of the strap 9 except where it is pierced by the holes 14 or 16.

This arrangement mechanically is effective to control electronic circuitry of the sort set forth in FIGS. 2 and 3. As shown therein and with some of the power, supply and display circuitry omitted for clarity since it is standard or repetitive, there is provided the series of light sources 18, 19 and 20 in the form of light emitting diodes connected by conductors 28 through resistors 29 to a source of power (not shown) such as a plus 5 volt source. The light sources are likewise connected by conductors 31 to ground or common. The arrangement is such that when the system is in operation the light emitting diodes 18, 19 and 20 are continuously energized and effective as sources of light.

The receptors 23, 24 and 25 in the A, B and C positions respectively are in fact photo cells of the transistor type each appropriately connected in its respective circuit. Each of the photo cells is provided with its own conductor 32 leading to a bus conductor 33 joined to a suitable power source (not shown) and has its output connected by a conductor 34 to a respective one of several amplifier stages 36, 37 and 38 likewise of the transistor variety and joined to the bus 33.

Further amplification is provided by connections 39 joining each of the amplifiers 36, 37 and 38 with one of another set of amplification devices 41, 42 and 43 respectively. Each of these is joined by an appropriate one of a set of conductors 44 through a resistor 45 to a suitable source of power and is shunted by a resistor 47 joined to a bus 48 extending to circuit common. The circuitry and elements so far described amount to an assembly that can easily be mounted on a sensor board and having the effect of detecting photo energization of any one of the three circuits so provided.

The subsequent circuitry provides a logic assembly to supplement the sensing circuitry. From the amplifier 41, there is afforded a conductor 51 having a capacitor 52 joining it to circuit common and leading into a Schmitt trigger 53 S. Trig. in drawings. From the trigger 53 there is a conductor 54 joined to a first JK flip-flop 56 at the J terminal thereof. From the conductor 54 there is a shunt line 57 leading to the K terminal of the flip-flop 56. Similarly, a conductor 51 from the amplifier 42 has a capacitor 58 joined to circuit common and extends to another Schmitt trigger 59 having a lead 61 extending to a second JK flip-flop 62 and being joined to the J terminal thereof. A shunt line 63 from the lead 61 extends to the K terminal of the second flip-flop 62. In an entirely comparable fashion the third amplifier 43 has a conductor 51 which extends to a third Schmitt trigger 64 and is provided with a capacitor 66 joined to circuit common. From the third Schmitt trigger 64, there is a conductor 67 extending to a third JK flip-flop 68 at the J terminal thereof. A shunt connector 69 is joined to the K terminal of the flip-flop 68. Each of the conductors 54, 61 and 67 includes an inverter 70 therein. In this fashion there are provided three substantially similar circuits to the JK flip-flops 56, 62 and 68.

From the conductor 54 of the first main circuit there is a branch lead 71 extending to a multiple nand gate 72. Similarly the conductor 61 of the second main circuit has a conductor 73 joined to the nand gate 72 while the conductor 67 of the third main circuit has a conductor 74 also extending to the nand gate 72. From this nand-gate 72, there is a lead 76 connected through an and-gate 77 having a nand-gate 78 joining it to circuit common and leading into a one shot multi-vibrator 81 (1-shot M.V. in drawings). A resistor 82 and a capacitor 83 join the one shot multi-vibrator 81 to a source of positive voltage. An output connector 84 extends from the multi-vibrator 81 to a terminal or connector at the right of FIG. 2 and later to be described. The conductor 84 also is joined through nand-gate 86 to an and-gate 87 having a lead 88 joining it to the positive voltage source. The and-gate 87 controls a second one shot multi-vibrator 89 connected through a resistor 91 and a capacitor 92 to the voltage source. From the effective clock or timing mechanism afforded by the one shot multi-vibrators, there is a conductor 93 extending from the multi-vibrator 89 to a junction point 94. From this junction point, a lead 96 extends in one direction to a connector 97 going to the reset terminal C of the first JK flip-flop 56 and continuing to a lead 98 to a similar C connection on the JK flip-flop 62 and to a connector 99 to the C terminal of the JK flip-flop 68. The lead 96 also extends to the right of the junction point 94 to the edge of FIG. 2 and continues on FIG. 3.

There is a conductor 101 extending from the Q terminal of the JK flip-flop 56 to a lead 102 extending to one terminal of the third nand-gate 103 in a primary group of three nand-gates. The conductor 101 is continued through a lead 104 to one terminal of a nand-gate 106 which is the second in a group of three secondary nand-gates. In a comparable fashion the Q terminal of the JK flip-flop 62 is joined by a conductor 107 to a lead 108 extending to one terminal of the first nand-gate 109 in the primary group and to a lead 111 extending to one terminal of the third nand-gate 112 in the secondary group of nand-gates. In a similar fashion the Q terminal of the third JK flip-flop 68 has a conductor 113 joined to a lead 114 extending to a terminal of the first nand-gate 116 in the secondary group and also is joined to a lead 117 extending to one side of the second nand-gate 118 in the primary group.

The various nand-gates in the two groups are likewise provided with additional enabling circuitry. For example, the conductor 57 to the K terminal of the JK flip-flop 56 has a junction from which extends a conductor 121 joined to a conductor 122 having a terminal at the other input to the nand-gate 109 and is likewise connected through a lead 123 to the other input terminal of the nand-gate 116.

Similarly, the conductor 63 to the K terminal of the JK flip-flop 62 is joined by a conductor 124 to the other input to the nand-gate 106 while a branch conductor 126 extends from the conductor 124 to the other input terminal of the nand-gate 118.

Again, in a parallel fashion, the conductor 69 to the K terminal of the JK flip-flop 68 has a conductor 127 extending through a lead 128 to the other input to the nand-gate 112 and also has a lead 129 extending to the other input to the nand-gate 103.

The various nand-gates 109, 118 and 103 in the primary group are connected by leads 131 to a multiple nand-gate 132 having a conductor 133 leading therefrom to the edge of FIG. 2 and picked up again in FIG. 3.

In the secondary group the nand-gates 116, 106 and 112 also are joined by leads 134 to a multiple nand-gate 136 having a conductor 137 leading from FIG. 2 into FIG. 3.

For a special purpose, later to be described, there is also provided in the circuitry of FIG. 2 a reset arrangement. Extended from the conductor 127 by a lead 138 is a connection to a reset nand-gate 139. The other input terminal of the nand-gate 139 is joined to the conductor 122. From the reset nand-gate 139 a conductor 141 extends to the edge of FIG. 2 and into FIG. 3.

As shown particularly in FIG. 3, the conductor 96 on the right hand side of the junction 94 and extending from the time one-shot multi-vibrator 89 is connected to one terminal of an nand-gate 142. The other input to this nand-gate is appropriately supplied from the conductor 133 leading from the nand-gate 132 of the primary nand-gate group and the conductor 137 leading from the nand-gate 136 of the secondary nand-gate group. The conductors 133 and 137 extend through inverters 143 and 144 and through a secondary nand-gate 146 to the other input terminal of the nand-gate 142.

The conductor 133 from the primary group of nand-gates has a branch 147 extending to the J terminal of a JK directional flip-flop 148. The K terminal of the flip-flop 148 is supplied by a conductor 149 joined to the conductor 137 from the secondary group of nand-gates. The C terminal of the JK directional flip-flop 148 is joined to the conductor 84 and its Q terminal or output is connected by a lead 151 to the directional or mode control inputs 152 of a series of indicator registers 153. These are so-called "four bit shift registers" and are of generally standard construction. Each is provided with a number of output leads 154 each one of which is joined to a transistor 156 appropriately connected in circuit and connected to a light emitting diode 157 so that under an enabled condition of the lead 154 there is light emitted from the diode 157 to serve as an indicator.

In the present instance, there are nine of the register units 153 and there are four leads 154 from each of the units. There is thus afforded a series or array of light indicators 157 corresponding to thirty-six distinct positions of the strap 9 within the yoke 7. Thirty-six individual locations of the movable element 9 with respect to the stationary element 6 can be indicated by the lights 157 when illuminated. The arragement is such that a signal in the conductor 151 conditions the various units 153 to indicate either an additional light 157 for one direction or the absence of a signal indicates the extinguishment of one of the lights 157 to indicate the opposite direction. Stated differently, a signal in the line 151 indicates one of the directions; for example, up, whereas an absence of such a signal in the conductor 151 indicates the opposite direction; for example, down.

The conductor 141 extends to a junction 161 from which a branch 162 extends to the M or reset terminal 163 of the directional flip-flop 148. When a signal is in the line 162 the directional flip-flop 148 is reset. The conductor 141 from the junction 161 extends through an inverter 164 into a nand-gate 165. The other input to the nand-gate 165 is joined by a conductor 166 to a relatively high speed clock 167 extending through appropriate circuitry to the system common. The output from the nand-gate 165 is carried by a lead 168 to an inverter 169. This gate 169 is also supplied through a conductor 171 from the output of the nand-gate 142. From the nand-gate 169 there is a lead 172 extending to a bus conductor 173 connected through inverting amplifiers to leads 174 going to the various registers 153.

Also branching from the conductor 141 at a junction 176 is a conductor 177 going to a selector switch 178 which can connect the last register 153 to the conductor 177 or to a source of plus 5 volts 179 or to circuit common 181 or to a conductor 182 leading to a second selector switch 183. This latter switch has three positions to connect to the conductor 182 or to a source of plus 5 volts 184 or to circuit common 186. The switch 183 is joined by a lead 187 to an end input to the top register 153 and through it to the respective inputs of the various other registers.

At a suitable point in association with the array of light emitting diodes 157 is another light emitting diode 188 connected to circuit common by a lead 189 and to a source of plus 5 volts by a lead 191 so that the diode 188 acts as a pilot light whenever the 5 volt power source is activated and thus indicates that the system as a whole is energized and available for operation.

Again with special reference to FIG. 2 and considering that openings 14 are in the A spaces 11 and that the B spaces 12 are blank and that the C spaces 13 are blank, there are various signal sequences which can be derived from the receptors 23, 24 and 25 depending upon the position and movement of the bar 9. Using the designation 0 as meaning that light is transmitted through the opening 14 and using the designation — as meaning there is no light or there is a blank, then the bar 9 can be in a position with a transmitting A area 11 opposite the receiver 23 or opposite the receivers 24 and 25. These several positions are as shown in the following table, the first column indicating the particular area, the second column indicating the position of the opening 14 and the adjacent blanks 12 and 13 in the band and the third column indicating the receptors 23, 24 and 25.

TABLE

| Band 9 Area | Present Receptors | Band 9 Area | Up Receptors | Band 9 Area | Down Receptors |
|---|---|---|---|---|---|
| C |   | A |   | B |   |
| A | 0 | 23 | B | — | 23 | C | — | 23 |
| B | — | 24 | C | — | 24 | A | 0 | 24 |
| C | — | 25 | A | 0 | 25 | B | — | 25 |
| A |   | B |   | C |   |

TABLE-continued

| Band 9 Area | Present Receptors | Band 9 Area | Up Receptors | Band 9 Area | Down Receptors |
|---|---|---|---|---|---|
| B |   | C |   | A |   |
| C | — | 23 | A | 0 | 23 | B | — | 23 |
| A | 0 | 24 | B | — | 24 | C | — | 24 |
| B | — | 25 | C | — | 25 | A | 0 | 25 |
| C |   | A |   | B |   |
| A |   | B |   | C |   |
| B | — | 23 | C | — | 23 | A | 0 | 23 |
| C | — | 24 | A | 0 | 24 | B | — | 24 |
| A | 0 | 25 | B | — | 25 | C | — | 25 |
| B |   | C |   | A |   |

There being three possible starting positions for any one group A, B and C and either an up position or a down position following each starting position, there is a total of six more possibilities, as the chart shows.

When the system is energized and assuming the parts are in position shown in FIG. 1, the opening 14 permits light to flow from the central source 19 to the central receptor 24 but light from the sources 18 and 20 is blocked from the receptors 23 and 25. The particular circuits from the elements 23 and 25 are not energized, but the circuit connected to the receptor 24 is energized.

With the receptor or terminal 24 energized, a signal from the corresponding trigger 59 appears in the conductors 61 and 63. Through the conductor 73 and the nand-gate 72 the multi-vibrator 89 is energized to send a pulse through the conductors 93 and 96 as well as 98 to the C terminal of the flip-flop 62. The signal in the conductor 63 goes to the K terminal of the flip-flop 62 and also through the conductor 124 to one side of the secondary and-gate 106 and through the conductor 126 to one input to the primary nand-gate 118. When the pulse arrives through the conductor 98 at the C terminal of the JK flip-flop 62, the signals at the nand-gates 106 and 109 are replaced by signals through the conductor 107 and the conductor 111 going to one input to the secondary nand-gate 112 and through the conductor 108 going to one input to the primary nand-gate 109. This condition remains while the band 9 is stationary.

Should the band 9 then rise so that the upper light source 18 shines through the hole 14 upon the upper receptor 23, the previous energization of the receptor 24 stops and the receptor 23 takes over. A signal then appears in the conductor 54 and through the conductor 71 at the nand-gate 72 to send a clock pulse through the conductor 96 to the flip-flop 56. But the signal in the conductor 54 is also present in the conductor 57 and through the conductors 121 and 122 energizes one input to each of the and-gates 109 and 116. As noted just above, the nand-gate 109 was energized at one input but the nand-gate 116 was not so energized. Thus the new signal affords the full conditioning of the one nand-gate 109 and results in a signal therefrom through the conductor 131 and the nand-gate 132 into the conductor 133, and so through the nand-gate 146 to condition the nand-gate 142 and through the conductor 147 to the directional flip-flop 148. This affords a signal through the conductor 151 to set all the registers 153 in the up mode. The signal in conductor 96 acts to complete the signals to the nand-gate 142. There is consequently a signal through the conductor 171 and the nand-gate 169 to energize the conductors 172, 173 and 174 and so to shift the registers 153 one step in the up direction and light an additional "up" light 157. This then, corresponds exactly to the movement of the band 9 which energized the receptor 23.

Should the band 9 go down instead of up from the position energizing the central receptor 24, then that receptor is extinguished and the lower source 20, through the descended A hole 14, illuminates the lower receptor 25. The circuits are traced very much as before but now through the conductors 127 and 128 and 129 to the nand-gate 103 in the primary group and the nand-gate 112 in the secondary group. Since there is no preconditioning of the nand-gate 103 of the primary group (there being no signal in conductor 101) that means that only the nand-gate 112 is fully energized and the resulting signal therefore passes through the nand-gate 136 into the conductor 137 and, upon receipt of the clock pulse through the conductor 84, reverses the condition of the directional flip-flop 148 and through the conductor 151 conditions the registers 153 to reverse mode. When the timing pulse in the conductor 96 is transmitted through the conductors 171, 172, 173 and 174 the registers 153 are shifted to extinguish top light 157 corresponding to the one unit down shift of the band 9 from the receptor 24 to the receptor 25.

The foregoing description starts with the receptor 24 being energized and describes the conditions for up movement energizing the receptor 23 and for down movement energizing the receptor 25. Very similar operations take place from any starting point and for either direction of movement and repeat themselves over and over, depending upon direction of band movement, for the full length (or height) of the band 9. This is because the A, B and C areas repeat, as do the openings 14, for each of the groups.

In the foregoing fashion, the movement of the bar or strap 9 from any previously registered position either upwardly into a newly registered position or downwardly into a newly registered position affords not only an indication of the direction of movement but also for each interval of movement causes the illumination or the extinguishment of one of the indicating diodes 157. This operation takes place repeatedly as the bar rises and falls over the entire scale possible in the registers so that there is afforded an illumination in those light elements which are directly indicative of the momentary position of the moving part 9.

Particularly in accordance with the invention, means are provided for affording a reset of the mechanism when the slide 9 arrives at a terminal position. As particularly shown in FIG. 1, the code of the band 9 is altered at its end. While the band or slide end still has the customary opening 14 in the A area, and while the B area 12 is still blank, there is in this one instance an opening 16 in the code area 13 corresponding to the end C positon. In this extreme position there can be illumination simultaneously transmitted through both the A and the C areas. When the slide 9 gets to that end point, then there is a signal from the receptor 23 transmitted through the Schmitt trigger 53 into the conductor 57 and the conductor 121 and thence into the conductor 122 to one input to the nand-gate 139. Also, there is illumination through the opening 16 in the C area furnishing a signal to the receptor 25 and in the conductor 51 to the Schmitt trigger 64. This furnishes a signal through the conductor 69 and the conductor 127 and the conductor 138 to the other input to the nand-gate 139. The resulting signal from the nand-gate 139, as a reset signal, is sent through the conductor 141 to the junction 176 from which it travels to the junction 161 and through the conductor 162 to the connection 163 in the directional flip-flop 148 to reset that mechanism. The reset impulse also travels into the nand-gate 165. The other input to the nand-gate 165 is supplied with a time signal from the high speed clock flip-flop 167 through the conductor 166 so that the nand-gate 165 is effective through the conductor 168 to energize the nand-gate 169. A resulting signal goes into the conductor 172 and the conductor 173 and through the branches 174 to reset the various registers.

The particular form of display that occurs and that responds to the reset depends upon the user's choice of setting the switches 178 and 183. When the switch 178 is joined to the conductor 181 and the switch 183 is joined to the conductor 184 there is shown a continuous light bar starting at the top and coming down. When the switch 178 joins the conductor 179 and the switch 183 joins the conductor 186 then the display is a continuous light bar going up from the bottom. When the switch 178 joins the conductor 182 and the switch 183 also joins the conductor 182 then the display is of but one light at a time working an appropriate direction with the movement. When the switch 178 joins the reset conductor 177 and the switch 183 joins the conductor 184 then the display is of a light bar coming down which is reset when the band 9 comes to the end.

What is claimed is:

1. A motion transducer comprising a relatively stationary yoke having spaced arms, a rectilinear strap movable along a longitudinal axis between the arms of said yoke, means on one arm of said yoke for projecting a plurality of discrete spaced light beams toward a corresponding plurality of light receivers on the other arm of said yoke, said beams being spaced parallel to said axis, means included in said strap for blocking all but one of said light beams corresponding to the momentary relative position of said yoke and said strap, an indicating register, and logic means responsive to a change from one to another of said light receivers that is unblocked, as a result of movement of said strap, for controlling a corresponding actuation of said indicating register.

2. A motion transducer as in claim 1 in which there are three of said projecting means and three of said light receivers, and said blocking means is an opaque portion of said strap effective to block two of said light beams at a time and said strap having an opening therein effective to pass but one of said light beams at said time.

3. A motion transducer as in claim 2 in which said projecting means and said light receivers are separated by equal spaces in the direction of translation of said strap relative to said yoke and said strap has a plurality of said openings therein spaced apart in the direction of said translation a distance equal to three of said spaces.

4. A motion transducer as in claim 1 in which said indicating register includes direction indicating means to indicate the direction of movement of said strap relative to said yoke in either of two opposite directions, said logic means also being responsive to sequential changes in energization of said light receivers for correspondingly operating said direction indicating means.

5. A motion transducer as in claim 4 in which said indicating register includes a plurality of indicators, and means responsive to sequential changes in energization of said light receivers for correspondingly operating corresponding individual ones of said indicators.

6. A motion transducer as in claim 1 in which said means for producing actuation of said register includes a device for timing actuation of said register.

7. A motion transducer as in claim 1 including means for resetting said register, said strap including an additional opening in a predetermined location for actuating said direction indicating means.

8. A motion transducer as in claim 7 in which said additional opening is adjacent one end of said strap and is positioned with respect to one of said others of said openings so that said additional opening and said one opening pass two of said light beams at the same time to two of said light receivers, and in which simultaneous actuation of said two light receivers actuates said direction indicating means.

9. A motion transducer as in claim 1 in which said indicating register includes a series of indicator lights arranged in a line having two ends, and in which said actuation means includes selecting means for energizing said indicator lights beginning at either chosen one of said two ends of said line.

* * * * *